United States Patent [19]

Birkhofer et al.

[11] Patent Number: 5,914,442
[45] Date of Patent: *Jun. 22, 1999

[54] AQUEOUS SOLUTIONS OR DISPERSIONS OF COPOLYMERS

[75] Inventors: Hermann Birkhofer, Ludwigshafen; Michael Kneip, Frankenthal; Peter Danisch, Ludwigshafen; Walter Denzinger, Speyer; Axel Kistenmacher, Ludwigshafen; Heinrich Hartmann, Limburgerhof, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/676,233

[22] PCT Filed: Jan. 16, 1995

[86] PCT No.: PCT/EP95/00144

§ 371 Date: Jul. 25, 1996

§ 102(e) Date: Jul. 25, 1996

[87] PCT Pub. No.: WO95/20056

PCT Pub. Date: Jul. 27, 1995

[30] Foreign Application Priority Data

Jan. 25, 1994 [DE] Germany ............... 44 02 029

[51] Int. Cl.⁶ ............... C14C 9/02; C14C 11/00
[52] U.S. Cl. ............ 8/94.21; 8/94.22; 8/94.23; 252/8.57
[58] Field of Search ............... 252/363.5, 8.57; 8/94.21, 94.22, 94.23; 524/804; 525/327.7, 243; 526/911

[56] References Cited

U.S. PATENT DOCUMENTS

| 4,527,992 | 7/1985 | Friese et al. ............... 8/94.21 |
| 5,124,181 | 6/1992 | Schaffer et al. ............ 525/329.9 |
| 5,348,807 | 9/1994 | Hodder et al. ............. 8/94.21 |
| 5,433,752 | 7/1995 | Birkhofer et al. .......... 8/94.21 |
| 5,501,707 | 3/1996 | Schieferstein et al. ...... 8/94.21 |
| 5,620,748 | 4/1997 | Birkhofer et al. .......... 8/94.21 |

FOREIGN PATENT DOCUMENTS

| 26 29 748 | 7/1976 | Germany . |
| 372 746 | 11/1989 | Germany . |
| WO 93/05188 | 3/1993 | WIPO . |
| WO 93/17130 | 9/1993 | WIPO . |

OTHER PUBLICATIONS

Hawley's Condensed Chemical Dictionary, 11th Edition, (Van Nostrand Reinhold Company, NY, NY, copyright 1987) p. 300.

*Primary Examiner*—Richard D. Lovering
*Assistant Examiner*—Daniel S. Metzmaier
*Attorney, Agent, or Firm*—Oblon, Spivak, McClelland, Maier & Neustadt, P.C.

[57] ABSTRACT

Aqueous solution or aqueous dispersion of copolymers suitable for the fatliquoring and filling of leather and fur skins are obtained by free-radical copolymerization of $A^1$) $C_6$–$C_{40}$-monoolefins or $C_6$–$C_{40}$-alkyl vinyl ethers or mixtures thereof with $B^1$) monoethylenically unsaturated $C_4$–$C_8$-dicarboxylic anhydrides or by free-radical copolymerization of $A^2$) $C_6$–$C_{40}$-alkyl acrylates or methacrylates or vinyl esters of $C_6$–$C_{40}$-carboxylic acids or mixtures thereof with $B^2$) monoethylenically unsaturated $C_3$–$C_{12}$-carboxylic acids, monoethylenically unsaturated $C_4$–$C_{12}$-dicarboxylic anhydrides, monoesters or monoamides of monoethylenically unsaturated $C_4$–$C_{12}$-dicarboxylic acids, amides of monoethylenically unsaturated $C_3$–$C_{12}$-carboxylic acids or mixtures thereof to give copolymers with molecular weights of 500 to 30,000, where the carboxyl groups which are present in aqueous medium are at least partially neutralized, and some of the carboxylic groups can be in amidated form, containing 0.5–40% by weight, based on the amount of copolymer, of defined emulsifiers.

30 Claims, No Drawings

AQUEOUS SOLUTIONS OR DISPERSIONS OF COPOLYMERS

This is a 371 of PCT/EP95/00144 of Jan. 16, 1995.

BACKGROUND OF THE INVENTION

1. Field of the Invention

The present invention relates to novel aqueous solutions or aqueous dispersions of copolymers. The invention furthermore relates to the use of these aqueous solutions or dispersions for the fatliquoring or filling of leather and fur skins.

2. Discussion of the Background

DE-A 39 26 167 (1) discloses the use of copolymers which are obtainable by free-radical copolymerization of $C_8$–$C_{40}$-monoolefins with ethylenically unsaturated $C_4$–$C_8$-dicarboxylic anhydrides in the manner of a bulk polymerization at 80 to 300° C. to give copolymers with molecular weights of from 500 to 20,000, subsequent solvolysis of the anhydride groups of the copolymers and at least partial neutralization, in aqueous medium with bases, of the carboxyl groups produced in the solvolysis, and which are in the form of aqueous solutions or dispersions, for the water-repellent treatment of leather and fur skins.

DE-A 39 26 168 (2) discloses the use of copolymers which are obtainable by free-radical polymerization of $C_8$–$C_{40}$-alkyl vinyl ethers or mixtures of $C_8$–$C_{40}$-alkyl vinyl ethers and up to 50 mol % of $C_8$–$C_{40}$-monoolefins with ethylenically unsaturated $C_4$–$C_8$-dicarboxylic anhydrides to give copolymers with molecular weights of 500 to 20,000, subsequent solvolysis of the anhydride groups of the copolymers and at least partial neutralization, in aqueous medium with bases, of the carboxyl groups produced in the solvolysis, and which are in the form of aqueous solutions or dispersions, for the water-repellent treatment of leather and fur skins.

DE-A 39 31 039 (3) discloses the use of copolymers which contain as copolymerized units 50 to 90% by weight of $C_8$–$C_{40}$-alkyl (meth)acrylates and/or vinyl esters of $C_8$–$C_{40}$-carboxylic acids and 10 to 50% by weight of monoethylenically unsaturated $C_3$–$C_{12}$-carboxylic acids, monoethylenically unsaturated C4–$C_{12}$-dicarboxylic anhydrides and/or derivatives thereof, and which have molecular weights of 500 to 30,000, in at least partially neutralized form in aqueous solution or dispersions for the water-repellent treatment of leather and fur skins.

The water repellents for leather containing the copolymers from publications (1) to (3) are free of additional emulsifiers. Besides the water-repellent action, these compositions additionally have a certain fatliquoring and retanning action.

EP-A 372 746 (4) describes aqueous dispersions of water-insoluble amphiphilic copolymers as auxiliaries for the treatment of tanned leather. These amphiphilic copolymers are composed of a larger proportion of a hydrophobic monomer, for example long-chain alkyl (meth)acrylates, primary alkenes or vinyl esters of long-chain alkylcarboxylic acids, and a smaller proportion of a hydrophilic monomer, for example (meth)acrylic acid, maleic acid and their anhydrides. The compositions are used to improve the water resistance of the leather. The dispersions are used without additional emulsifiers.

DE-C 26 29 748 (5) discloses the use of copolymers of $C_{10}$–$C_{30}$-olefins and maleic anhydride, which are hydrolyzed with alkali metal bases or amines, for the filling and fatliquoring of leather and fur skins. The hydrolyzed copolymers may also be reacted with alkali metal bisulfite. Since the copolymers are prepared in organic solvents, and the latter are not removed, the aqueous copolymer dispersions prepared therefrom contain considerable amounts of organic solvents, for example xylene or dodecylbenzene.

SUMMARY OF THE INVENTION

It is an object of the present invention to provide leather fatliquoring agents with improved properties. It was also the intention to dispense entirely with the use of organic solvents because these are undesirable for ecological reasons. In particular, the agents were intended to have a pure fatliquoring and filling action, and the water-repellent effect which is usually also observed with such agents was to be entirely suppressed or at least negligibly smaller, because fatliquoring and water-repellent treatment of leather are two fundamentally different applications of such aftertreatment agents.

We have found that this object is achieved by aqueous solutions or aqueous dispersions of copolymers which are obtainable by free-radical copolymerization of $A^1$) 40–60 mol % of $C_6$–$C_{40}$-monoolefins or $C_6$–$C_{40}$-alkyl vinyl ethers or mixtures of $C_6$–$C_{40}$-alkyl vinyl ethers and up to 50 mol %, based on the total amount of component $A^1$, of $C_6$–$C_{40}$-monoolefins with $B^1$) 60–40 mol % of monoethylenically unsaturated $C_4$–$C_8$-dicarboxylic anhydrides or by free-radical copolymerization of $A^2$) 50–90% by weight of $C_6$–$C_{40}$-alkyl acrylates or methacrylates or vinyl esters of $C_6$–$C_{40}$-carboxylic acids or mixtures thereof with $B^2$) 10–50% by weight of monoethylenically unsaturated $C_3$–$C_{12}$-carboxylic acids, monoethylenically unsaturated $C_4$–$C_{12}$-dicarboxylic anhydrides, monoesters or monoamides of monoethylenically unsaturated $C_4$–$C_{12}$-dicarboxylic acids, amides of monoethylenically unsaturated $C_3$–$C_{12}$-carboxylic acids or mixtures thereof to give copolymers with molecular weights of 500 to 30,000, where the carboxyl groups which are present in aqueous medium are at least partially neutralized, and some of the carboxyl groups can be in amidated form, and which have a content of 0.5–40% by weight, based on the amount of copolymer, of emulsifiers.

DETAILED DESCRIPTION OF THE PREFERRED EMBODIMENTS

The copolymers which are used for this purpose and are composed of components $A^1$ and $B^1$ or $A^2$ and $B^2$ are disclosed in publications (1) to (3). For this reason, details of their exact composition, examples of monomer components and the mode of their preparation and solvolysis, neutralization and amidation are not given here; this information may be found in publications (1) to (3).

Particularly suitable $A^1$ monomers are $C_8$–$C_{30}$-monoolefins, in particular $C_{10}$–$C_{24}$-olefins, and $C_8$–$C_{30}$-alkyl vinyl ethers, in particular $C_{10}$–$C_{24}$-alkyl vinyl ethers.

Particularly suitable $A^2$ monomers are $C_8$–$C_{30}$-alkyl (meth)acrylates, in particular $C_{10}$–$C_{24}$-alkyl (meth)acrylates, and vinyl esters of $C_8$–$C_{30}$-carboxylic acids, in particular of $C_{10}$–$C_{24}$-carboxylic acids.

Particularly suitable monomers $B^1$ and $B^2$ are acrylic acid, methacrylic acid, maleic acid and, especially, maleic anhydride.

The molecular weights of the described copolymers are preferably from 500 to 20,000, in particular 1,000 to 12,000.

The aqueous solutions or dispersions according to the invention have a content of from 0.5 to 40% by weight, preferably 3 to 35% by weight, in particular 10 to 30% by weight, based on the amount of copolymer, of emulsifiers. Emulsifiers which can be used are in principle all compounds which have surface activity in aqueous systems and are nonionic, anionic, cationic or amphoteric in nature. Particularly good results are obtained with representatives of the following groups of emulsifiers:

(a) alkoxylated fatty alcohols or oxo alcohols of the general formula I

  (I)

where
$R^1$ is straight-chain or branched $C_6$–$C_{30}$-alkyl or -alkenyl, in particular $C_8$–$C_{20}$-alkyl or -alkenyl,
X and Y are each, independently of one another, ethylene or propylene and
m and n are each, independently of one another, numbers from 0 to 100, where the total of m+n must be 2 to 100;
those of these which are particularly preferred are ethoxylated fatty alcohols or oxo alcohols with 5 to 90, in particular 15 to 80, ethylene oxide (EO) units, e.g. isotridecanol with 8 EO (Lutensol® AO 8 and TO 8, products of BASF Aktiengesellschaft, as moreover are all the following named commercial products) or tallow fatty alcohol with 11, 18, 25, 50 or 80 EO (Lutensol AT 11, AT 18, AT 25, AT 50 and AT 80 or Siligen® WL); also very suitable are mixed propoxylated (PO) and ethoxylated fatty alcohols or oxo alcohols, e.g. $C_8/C_{10}$-oxo alcohol with 5.5 PO+8.3 EO (Plurafac® LF 601), $C_{13}/C_{15}$-oxo alcohol with 21 EO+4 PO (Plurafac LF 401) or $C_{13}/C_{15}$-oxo alcohol with 12 EO+6 PO (Plurafac LF 600);

b) block copolymers of ethylenoxy and propylenoxy units with a molecular weight of 500 to 15,000, in particular of 1,000 to 10,000; examples [sic] thereof is a block copolymer of 10% by weight EO and 90% by weight PO (Pluronic® RPE 2510);

(c) alkoxylated fatty acids or [sic] the general formula II

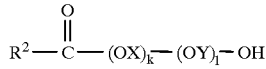  (II)

where
$R^2$ is straight-chain or branched $C_5$–$C_{29}$-alkyl or -alkenyl, in particular $C_7$–$C_{19}$-alkyl or -alkenyl,
X and Y are each, independently of one another, ethylene or propylene and
k and l are each, independently of one another, numbers from 0 to 40, where the total of k+l must be 2 to 50;
those of these which are particularly preferred are ethoxylated fatty acids with 2 to 50 ethylene oxide units, e.g. oleic acid with 5.5 EO (Emulan® A), tall oil fatty acid with 3 to 10 EO or castor oil with 35 to 48 EO;

(d) ethoxylated fatty acid amides of the general formula III

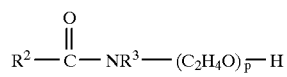  (III)

where
$R^2$ has the abovementioned meaning,
$R^3$ is hydrogen or the radical of the formula —$(C_2H_4O)_p$—H and
p is a number from 2 to 30;
Examples thereof are oleamide monoethoxylates, e.g. with 10 EO ($R^3$=H) (Lutensol FSA 10), or oleamide bisethoxylates, e.g. with twice 5 to 10 EO ($R^3$=$(C_2H_4O)_{5-10}$H);

(e) fatty acid alkanolamides of the general formula IV

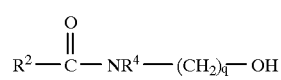  (IV)

where
$R^2$ has the abovementioned meanings,
$R^4$ is hydrogen or the radical of the formula —$(CH_2)_p$—OH [sic] and
q is a number from 2 to 4, in particular 2 or 3;
Examples thereof are oleic acid mono- and diethanolamides (Lupritan® HDF);

(f) fatty acid ammonium salts comprising saturated or unsaturated $C_6$–$C_{30}$-fatty acids, in particular $C_8$–$C_{20}$-fatty acids, with tri-$C_1$–$C_4$-alkylamines or with tetra-$C_1$–$C_4$-alkylammonium cations, where the $C_1$–$C_4$-alkyl groups in both cases additionally carry hydroxyl groups;
examples [sic] thereof is the oleic acid triethanolamine salt (Emulan FM);

(g) fatty alcohol phosphates of the general formula V

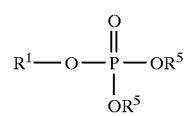  (V)

where
$R^1$ has the abovementioned meanings, and the two $R^5$ radicals are, independently of one another, hydrogen or $C_1$–$C_4$-alkyl, where at least one of the $R^5$ radicals is not hydrogen;

(h) $C_6$–$C_{30}$-alkyl glucosides;
examples thereof are $C_{10}$–$C_{14}$-monoalkyl glucosides (Lutensol GD 70);

(i) alkylphenol alkoxylates of the general formula (VI)

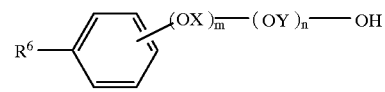  (VI)

where
- $R^6$ is straight-chain or branched $C_1$–$C_{20}$-alkyl, in particular $C_4$–$C_{13}$-alkyl, and
- X, Y, m and n have the abovementioned meanings;
- those of these which are particularly preferred are alkylphenol ethoxylates with 2 to 60 ethylene oxide units, e.g. p-iso-octylphenol with 5, 7 or 23 EO (Lutensol AP 6) or p-isononylphenol with 4, 5, 8, 9, 10, 14, 20 or 58 EO (Emulan PO, Lutensol AP 8, AP 9, AP 10, AP 14, AP 20, Emulan NP 50), (j) mono- or di-$C_5$–$C_{20}$-alkyl 2-sulfosuccinates;
- examples thereof are sodium diisoamyl 2-sulfosuccinate (Lutensit® ABP) and sodium di(2-ethylhexyl) 2-sulfosuccinate (Lutensit ABO);

(k) N-($C_9$–$C_{20}$-acyl)amino acids with 2–6 carbons in the underlying amino acid;
- the N-($C_9$–$C_{20}$-acyl)amino acids which are preferred are those with 2–4 carbons, with the amino group in the α position to the carboxly [sic] group which is in salt form, and with the amine nitrogen additionally substituted by a methyl group; those of these which have a particularly superior action are the fatty acid sarcosides comprising saturated or unsaturated fatty acids with 9 to 20, in particular 16 to 18, carbons; suitable salts are the alkali metal salts, in particular those of sodium or potassium, the ammonium salts or salts of a mono-, di- or trialkanolamine with 2 to 4 carbon atoms in the alkanol residue, in particular of mono-, di- or triethanolamine; a particularly preferred sarcoside is oleic acid sarcoside or N-oleoylsarcosine (Medialan acid); also to be particularly emphasized are N-stearoylsarcosine, N-lauroylsarcosine and N-isononanoylsarcosine, each in the form of the abovementioned salts.

On use of mixtures of emulsifiers from groups (a) to (k) there may in some cases be an enhancement of the action. Examples of such mixtures are mixtures of emulsifiers (a) and (c), (a) and (h) or (a) and (k) in the weight ratio of, in each case, 5:95 to 95:5, in particular 20:80 to 80:20.

Admixture of the emulsifier to the copolymers may take place at various stages in the process for preparing the aqueous solutions or dispersions according to the invention. The emulsifiers may be added to a melt of the copolymers if these have been prepared by bulk polymerization, and subsequently the solvolysis, neutralization and/or amidation can be carried out. It is furthermore possible to mix the emulsifiers with an aqueous solution of the neutralizing agent, e.g. alkali metal hydroxides such as NaOH or KOH, and to add this solution to the copolymers. The emulsifiers may also be added only finally after preparation of the aqueous solution or dispersions of the solvolyzed, neutralized and/or amidated copolymers. It is also possible in some circumstances to add the emulsifiers even during the copolymerization of monomers $A^1$ and $B^1$ or $A^2$ and $B^2$.

The aqueous solutions or aqueous dispersions according to the invention are outstandingly suitable for the fatliquoring and filling of leather and fur skins. Moreover, no organic solvents are present, and no noticeable water-repellent effect is observed.

The fatliquoring of the leather and the fur skins takes place by conventional methods known to the skilled worker and therefore need not be described here.

Compared with fatliquoring using conventional fatliquoring agents, the product is distributed better over the cross-section of the lether. Fatliquoring with, for example, only 2–3% by weight of active substance based on the aqueous solution or dispersion results in unusually soft leather with use of this quantity compared with conventional fatliquoring agents. The resulting leather is thus softer, which leads to savings in other fatliquoring agents which may be used. This, and the exceptionally firm binding of the polymer to the, for example chrome-tanned, fibers, results in distinctly less pollution of the waste water after the fatliquoring, i.e. the product has a very good exhaustion from the fatliquor.

The sensitivity to hard water and/or carried-over chromium(III) salts is, surprisingly, distinctly reduced. Addition of complexing agents is thus unnecessary, which is extremely advantageous because complexing agents have a detanning action, i.e. dissolve chromium out of chrome-tanned leather, and may also impair the dyeing.

The leather fatliquored with the aqueous copolymer solutions or dispersions according to the invention displays very good fastness and good fixing of the auxiliaries in the leather and thus low extractability, which leads to good washing resistance of the leather.

EXAMPLES

The following emulsifiers were added to a 25% by weight aqueous dispersion of a hydrolyzed and 50% neutralized, with NaOH, copolymer of $C_{20}$/$C_{24}$-α-olefin and maleic anhydride in the molar ratio 0.97:1:

(1) tallow fatty alcohol (natural $C_{16}$/$C_{18}$ fatty alcohol) with 25 EO
(2) tallow fatty alcohol with 80 EO
(3) oleic acid with 5.5 EO
(4) isotridecanol with 8 EO
(5) oleamide monoethoxylate with 10 EO
(6) oleic acid sarcoside
(7) oleic acid diethanolamide
(8) p-isononylphenol with 4.5 EO
(9) EO/PO block copolymer (10% by weight EO+90% by weight PO)
(10) $C_{12}$/$C_{14}$-alkyl glucoside
(11) sodium di(2-ethylhexyl) 2-sulfosuccinate
(12) oleic acid triethanolamine salt
(13) $C_{13}$/$C_{15}$-oxo alcohol with 21 EO+4 PO
(14) $C_{13}$/$C_{15}$-oxo alcohol with 12 EO+6 PO The amount of emulsifier was 5.3% of the weight of the aqueous dispersion in each case.

These emulsions were used for fatliquoring neutralized chrome-tanned side leather using 3% by weight of active substance in each case. The softness of the finished leather was compared with the treatment with the same copolymer dispersion without emulsifier as standard to give the following assessment:

| Emulsifier | Differential softness (score) |
| --- | --- |
| (1) | 2 |
| (2) | 2 |
| (3) | 3 |
| (4) | 2 |
| (5) | 3 |
| (6) | 3 |
| (7) | 3 |
| (8) | 3 |
| (9) | 2 |
| (10) | 2 |
| (11) | 2 |
| (12) | 1 |
| (13) | 2 |
| (14) | 2 |

Assessment scale for the softness of the leather: score from 1 (hard) to 10 (very soft)

Definition:

Differential softness=softness with emulsifier−softness without emulsifier

The resulting leather was soft and had a pleasant handle.

We claim:

1. A process for the fatliquoring and filling of leather and fur skins, which comprises fatliquoring and filling leather and fur skins with an aqueous solutions or aqueous dispersions consisting essentially of copolymers obtained by free-radical copolymerization of monomers selected from the group consisting of (A) and (B):

(A)$A^1$) monomers selected from the group consisting of 40–60 mol % of $C_6$–$C_{40}$-monoolefins, $C_6$–$C_{40}$-alkyl vinyl ethers and mixtures of $C_6$–$C_{40}$-alkyl vinyl ethers and up to 50 mol %, based on the total amount of component $A^1$, of $C_6$–$C_{40}$-monoolefins with $B^1$) 60–40 mol % of monoethylenically unsaturated $C_4$–$C_8$-dicarboxylic anhydrides, and (B)$A^2$) monomers selected from the group consisting of 50–90% by weight of $C_6$–$C_{40}$-alkyl acrylates, $C_6$–$C_{40}$-alkyl methacrylates, vinyl esters of $C_6$–$C_{40}$-carboxylic acids and mixtures thereof with $B^2$) 10–50% by weight of monomers selected from the group consisting of monoethylenically unsaturated $C_3$–$C_{12}$-carboxylic acids, monoethylenically unsaturated $C_4$–$C_{12}$-dicarboxylic anhydrides, monoesters of monoethylenically unsaturated $C_4$–$C_{12}$-dicarboxylic acids, monoamides of monoethylenically unsaturated $C_4$–$C_{12}$-dicarboxylic acids, amides of monoethylenically unsaturated $C_3$–$C_{12}$-carboxylic acids and mixtures thereof said copolymers having a molecular weights of 500 to 30,000, where the carboxyl groups which are present in aqueous medium are at least partially neutralized, and some of the carboxylic groups can be in amidated form, said aqueous solution or aqueous dispersion having a content of 0.5–40% by weight, based on the amount of copolymer, of emulsifiers other than said copolymers, said aqueous solution or dispersion having been prepared by first preparing said copolymer by free-radical copolymerization, followed by neutralization of the copolymer and then dissolving or dispersing the resulting neutralized copolymer in water, followed by the addition of said emulsifier, said emulsifiers being selected from the group consisting of:

(a) alkoxylated fatty alcohols or oxo alcohols of the general formula I $$R^1\text{—}(OX)_m\text{—}(OY)_n\text{—}OH \qquad (I)$$

where $R^1$ is straight-chain or branched $C_6$–$C_{30}$-alkyl or -alkenyl,

X and Y are each, independently of one another, ethylene or propylene and m and n are each, independently of one another, numbers from 0 to 100, where the total of m+n must be 2 to 100;

(b) block copolymers of ethylenoxy and propylenoxy units with a molecular weight of 500 to 15,000;

(c) alkoxylated fatty acids of the general formula II

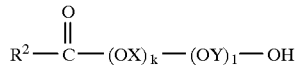

(II)

where $R^2$ is straight-chain or branched $C_5$–$C_{29}$-alkyl or -alkenyl,

X and Y are each, independently of one another, ethylene or propylene and k and l are each, independently of one another, numbers from 0 to 40, where the total of k+l must be 2 to 50;

(d) ethoxylated fatty acid amides of the general formula III

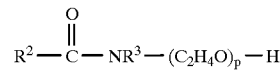

(III)

where

R2 has the above-mentioned meaning, $R^3$ is hydrogen or the radical of the formula —$(C_2H_4O)_p$—H and p is a number from 2 to 30;

(e) fatty acid alkanolamides of the general formula IV

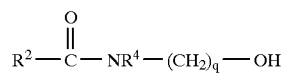

(IV)

where $R^2$ has the above-mentioned meanings, $R^4$ is hydrogen or the radical of the formula —$(CH_2)_q$—OH and q is a number from 2 to 4, (f) fatty acid ammonium salts of saturated or unsaturated $C_6$–$C_{30}$-fatty acids with tri-$C_1$–$C_4$-alkylamines or with tetra-$C_1$–$C_4$-alkylammonium cations, where the $C_1$–$C_4$-alkyl groups in said salts optionally carry hydroxyl groups;

(h) $C_6$–$C_{30}$-alkyl glucosides;

(i) alkylphenol alkoxylates of the general formula VI

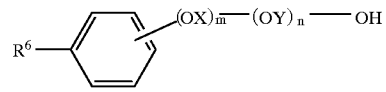

(VI)

where $R^6$ is straight-chain or branched $C_1$–$C_{20}$-alkyl, and

X, Y, m and N have the above-mentioned meanings; and (k) N—($C_9$–$C_{20}$-acyl)amino acides with 2–6 carbons in the amino acid.

2. A process according to claim 1, wherein the emulsifier is (a).

3. A process according to claim 1, wherein the emulsifier is (b).

4. A process according to claim 1, wherein the emulsifier is (c).

5. A process according to claim 1, wherein the emulsifier is (d).

6. A process according to claim 1, wherein the emulsifier is (e).

7. A process according to claim 1, wherein the emulsifier is (f).

8. A process according to claim 1, wherein the emulsifier is (g).

9. A process according to claim 1, wherein the emulsifier is (i).

10. A process according to claim 1, wherein the emulsifier is (k).

11. A process for preparing aqueous solutions or aqueous dispersions for fatliquoring and filling of leather and fur skins consisting essentially of free-radical polymerizing in an aqueous system monomers selected from the group consisting of (A) and (B):

(A)$A^1$) monomers selected from the group consisting of 40–60 mol % of $C_6$–$C_{40}$-monoolefins, $C_6$–$C_{40}$-alkyl vinyl ethers and mixtures of $C_6$–$C_{40}$-alkyl vinyl ethers and up to 50 mol %, based on the total amount of component $A^1$, of $C_6$–$C_{40}$-monoolefins with $B^1$) 60–40 mol % of monoethylenically unsaturated $C_4$–$C_8$-dicarboxylic anhydrides, and (B)$A^2$) monomers selected from the group consisting of 50–90% by weight of $C_6$–$C_{40}$-alkyl acrylates, $C_6$–$C_{40}$-alkyl methacrylates, vinyl esters of $C_6$–$C_{40}$-carboxylic acids and mixtures thereof with $B^2$) 10–50% by weight of monomers selected from the group consisting of monoethylenically unsaturated $C_3$–$C_{12}$-carboxylic acids, monoethylenically unsaturated $C_4$–$C_{12}$-dicarboxylic anhydrides, monoesters of monoethylenically unsaturated $C_4$–$C_{12}$-dicarboxylic acids, monoamides of monoethylenically unsaturated $C_4$–$C_{12}$-dicarboxylic acids, amides of monoethylenically unsaturated $C_3$–$C_{12}$-carboxylic acids and mixtures thereof said copolymers having a molecular weights of 500 to 30,000, where the carboxyl groups which are present in aqueous medium are at least partially neutralized, and some of the carboxylic groups can be in amidated form, said aqueous solution or aqueous dispersion and adding 0.5–40% by weight, based on the amount of copolymer, of emulsifiers other than said copolymers, said aqueous solution or dispersion having been prepared by first preparing said copolymer by free-radical copolymerization, followed by neutralization of the copolymer and then dissolving or dispersing the resulting neutralized copolymer in water, followed by the addition of said emulsifier, said emulsifiers being selected from the group consisting of:

(a) alkoxylated fatty alcohols or oxo alcohols of the general formula I $$R^1-(OX)_m-(OY)_n-OH \qquad (I)$$

where $R^1$ is straight-chain or branched $C_6$–$C_{30}$-alkyl or -alkenyl,

X and Y are each, independently of one another, ethylene or propylene and m and n are each, independently of one another, numbers from 0 to 100, where the total of m+n must be 2 to 100;

(b) block copolymers of ethylenoxy and propylenoxy units with a molecular weight of 500 to 15,000;

(c) alkoxylated fatty acids of the general formula II

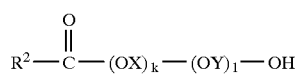

(II)

where $R^2$ is straight-chain or branched $C_5$–$C_{29}$-alkyl or -alkenyl,

X and Y are each, independently of one another, ethylene or propylene and k and l are each, independently of one another, numbers from 0 to 40, where the total of k+l must be 2 to 50;

(d) ethoxylated fatty acid amides of the general formula III

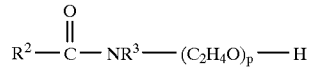

(III)

where $R^2$ has the above-mentioned meaning, $R^3$ is hydrogen or the radical of the formula $-(C_2H_4O)_p-H$ and p is a number from 2 to 30;

(e) fatty acid alkanolamides of the general formula IV

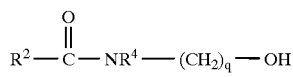

(IV)

where $R^2$ has the above-mentioned meanings, $R^4$ is hydrogen or the radical of the formula $-(CH_2)_q-OH$ and q is a number from 2 to 4, (f) fatty acid ammonium salts of saturated or unsaturated $C_6$–$C_{30}$-fatty acids with tri-$C_1$–$C_4$-alkylamines or with tetra-$C_1$–$C_4$-alkylammonium cations, where the $C_1$–$C_4$-alkyl groups in said salts optionally carry hydroxyl groups;

(h) $C_6$–$C_{30}$-alkyl glucosides;

(i) alkylphenol alkoxylates of the general formula VI

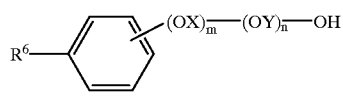

(VI)

where $R^6$ is straight-chain or branched $C_1$–$C_{20}$-alkyl, and

X, Y, m and N have the above-mentioned meanings; and (k) N—($C_9$–$C_{20}$-acyl)amino acides with 2–6 carbons in the amino acid.

12. A process according to claim 11, wherein the emulsifier is (a).

13. A process according to claim 11, wherein the emulsifier is (b).

14. A process according to claim 11, wherein the emulsifier is (c).

15. A process according to claim 11, wherein the emulsifier is (d).

16. A process according to claim 11, wherein the emulsifier is (e).

17. A process according to claim 11, wherein the emulsifier is (f).

18. A process according to claim 11, wherein the emulsifier is (h).

19. A process according to claim 11, wherein the emulsifier is (i).

20. A process according to claim 11, wherein the emulsifier is (k).

21. An aqueous solution or aqueous dispersion for fatliquoring and filling of leather and fur skins consisting essentially of copolymers obtained by free-radical copolymerization of monomers selected from the group consisting of (A) and (B):

(A)$A^1$) monomers selected from the group consisting of 40–60 mol % of $C_6$–$C_{40}$-monoolefins, $C_6$–$C_{40}$-alkyl vinyl ethers and mixtures of $C_6$–$C_{40}$-alkyl vinyl ethers and up to 50 mol %, based on the total amount of component $A^1$, of $C_6$–$C_{40}$-monoolefins with $B^1$) 60–40 mol % of monoethylenically unsaturated $C_4$–$C_8$-dicarboxylic anhydrides, and (B)$A^2$) monomers selected from the group consisting of 50–90% by weight of $C_6$–$C_{40}$-alkyl acrylates, $C_6$–$C_{40}$-alkyl methacrylates, vinyl esters of $C_6$–$C_{40}$-carboxylic acids and mixtures thereof with $B^2$) 10–50% by weight of monomers selected from the group consisting of monoethylenically unsaturated $C_3$–$C_{12}$-carboxylic acids, monoethylenically unsaturated $C_4$–$C_{12}$-dicarboxylic anhydrides, monoesters of monoethylenically unsaturated $C_4$–$C_{12}$-dicarboxylic acids, monoamides of monoethylenically unsaturated $C_4$–$C_{12}$-dicarboxylic acids, amides of monoethylenically unsaturated $C_3$–$C_{12}$-carboxylic acids and mixtures thereof said copolymers having a molecular weights of 500 to 30,000, where the carboxyl groups which are present in aqueous medium are at least partially neutralized, and some of the carboxylic groups can be in amidated form, said aqueous solution or aqueous dispersion having a content of 0.5–40% by weight, based on the amount of copolymer, of emulsifiers other than said copolymers, said aqueous solution or dispersion having been prepared by first preparing said copolymer by free-radical copolymerization, followed by neutralization of the copolymer and then dissolving or dispersing the resulting neutralized copolymer in water, followed by the addition of said emulsifier, said emulsifiers being selected from the group consisting of:

(a) alkoxylated fatty alcohols or oxo alcohols of the general formula I $$R^1\text{—}(OX)_m\text{—}(OY)_n\text{—}OH \qquad (I)$$

where $R^1$ is straight-chain or branched $C_6$–$C_{30}$-alkyl or -alkenyl,

X and Y are each, independently of one another, ethylene or propylene and m and n are each, independently of one another, numbers from 0 to 100, where the total of m+n must be 2 to 100;

(b) block copolymers of ethylenoxy and propylenoxy units with a molecular weight of 500 to 15,000;

(c) alkoxylated fatty acids of the general formula II

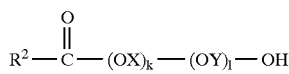

(II)

where $R^2$ is straight-chain or branched $C_5$–$C_{29}$-alkyl or -alkenyl,

X and Y are each, independently of one another, ethylene or propylene and k and l are each, independently of one another, numbers from 0 to 40, where the total of k+l must be 2 to 50;

(d) ethoxylated fatty acid amides of the general formula III

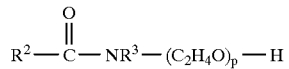

(III)

where $R^2$ has the above-mentioned meaning, $R^3$ is hydrogen or the radical of the formula —$(C_2H_4O)_p$—H and p is a number from 2 to 30;

(e) fatty acid alkanolamides of the general formula IV

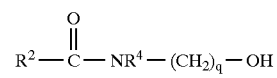

(IV)

where $R^2$ has the above-mentioned meanings, $R^4$ is hydrogen or the radical of the formula —$(CH_2)_q$—OH and q is a number from 2 to 4, (f) fatty acid ammonium salts of saturated or unsaturated $C_6$–$C_{30}$-fatty acids with tri-$C_1$–$C_4$-alkylamines or with tetra-$C_1$–$C_4$-alkylammonium cations, where the $C_1$–$C_4$-alkyl groups in said salts optionally carry hydroxyl groups;

(h) $C_6$–$C_{30}$-alkyl glucosides;

(i) alkylphenol alkoxylates of the general formula VI

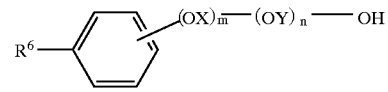

(VI)

where $R^6$ is straight-chain or branched $C_1$–$C_{20}$-alkyl, and

X, Y, m and N have the above-mentioned meanings; and (k) N—($C_9$–$C_{20}$-acyl)amino acides with 2–6 carbons in the amino acid.

22. An aqueous solution or dispersion according to claim 21, wherein the emulsifier is (a).

23. An aqueous solution or dispersion according to claim 21, wherein the emulsifier is (b).

24. An aqueous solution or dispersion according to claim 21, wherein the emulsifier is (c).

25. An aqueous solution or dispersion according to claim 21, wherein the emulsifier is (d).

26. An aqueous solution or dispersion according to claim 21, wherein the emulsifier is (e).

27. An aqueous solution or dispersion according to claim 21, wherein the emulsifier is (f).

28. An aqueous solution or dispersion according to claim 21, wherein the emulsifier is (h).

29. An aqueous solution or dispersion according to claim 21, wherein the emulsifier is (i).

30. An aqueous solution or dispersion according to claim 21, wherein the emulsifier is (k).

* * * * *